(12) United States Patent
Yang et al.

(10) Patent No.: US 12,418,761 B2
(45) Date of Patent: Sep. 16, 2025

(54) DIAPHRAGM FOR MICROSPEAKER AND MANUFACTURING METHOD THEREOF

(71) Applicant: 3M INNOVATIVE PROPERTIES COMPANY, St. Paul, MN (US)

(72) Inventors: Chao Yang, Shanghai (CN); Christopher B. Walker, Jr., St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 288 days.

(21) Appl. No.: 17/912,014

(22) PCT Filed: Mar. 3, 2021

(86) PCT No.: PCT/IB2021/051771
§ 371 (c)(1),
(2) Date: Sep. 15, 2022

(87) PCT Pub. No.: WO2021/186276
PCT Pub. Date: Sep. 23, 2021

(65) Prior Publication Data
US 2023/0131805 A1    Apr. 27, 2023

(30) Foreign Application Priority Data
Mar. 17, 2020 (CN) .......................... 202010186714.1

(51) Int. Cl.
*H04R 31/00* (2006.01)
*B32B 25/04* (2006.01)
(Continued)

(52) U.S. Cl.
CPC ............ *H04R 31/003* (2013.01); *C08J 3/247* (2013.01); *C08J 3/28* (2013.01); *H04R 7/02* (2013.01);
(Continued)

(58) Field of Classification Search
None
See application file for complete search history.

(56) References Cited

U.S. PATENT DOCUMENTS 9,359,529 B2    6/2016   Liu et al.
9,827,749 B2    11/2017  Egger et al.
(Continued)

FOREIGN PATENT DOCUMENTS

CN    101717520 A    6/2010
CN    104672788 A    6/2015
(Continued)

OTHER PUBLICATIONS

DuPont Hytrel—Product Guide and Properties. (2011) (Year: 2011).*
International Search Report for PCT International Application No. PCT/IB2021/051771, mailed on May 19, 2021, 4 pages.

*Primary Examiner* — Vivian Chen
(74) *Attorney, Agent, or Firm* — Kathleen B. Gross

(57) ABSTRACT

The invention provides a diaphragm for a microspeaker and a manufacturing method thereof. The diaphragm is a single-layer diaphragm or a multi-layer diaphragm and comprises at least one layer of a chemically cross-linked thermoplastic polyester elastomer, wherein: the chemically cross-linked thermoplastic polyester elastomer has a loss factor less than or equal to 0.4 at a temperature range not higher than a softening temperature of thermoplastic polyester elastomer before chemical crosslinking plus 40° C., as measured by a rheological curve; and the diaphragm further has a yield strain in the range of 7% to 30%. The diaphragm for a microspeaker according to the technical solution of the present invention is easy to be prepared by thermoforming, and has appropriate modulus, good strength, elasticity, and thermal stability.

20 Claims, 1 Drawing Sheet

(51) Int. Cl.
  *B32B 27/36* (2006.01)
  *C08J 3/24* (2006.01)
  *C08J 3/28* (2006.01)
  *H04R 7/02* (2006.01)

(52) U.S. Cl.
  CPC ............ *B32B 25/042* (2013.01); *B32B 27/36* (2013.01); *B32B 2274/00* (2013.01); *B32B 2307/10* (2013.01); *B32B 2307/102* (2013.01); *B32B 2307/54* (2013.01); *B32B 2307/7376* (2023.05); *B32B 2310/08* (2013.01); *B32B 2310/0875* (2013.01); *B32B 2310/0887* (2013.01); *B32B 2367/00* (2013.01); *H04R 2307/025* (2013.01)

(56) References Cited

U.S. PATENT DOCUMENTS

| | | |
|---|---|---|
| 10,856,083 B2 | 12/2020 | Cheng et al. |
| 11,317,211 B2 | 4/2022 | Wang et al. |
| 11,457,316 B2 | 9/2022 | Wang et al. |
| 11,962,986 B2 | 4/2024 | Wang et al. |
| 12,163,000 B2 | 12/2024 | Wang et al. |
| 2010/0170746 A1* | 7/2010 | Restuccia ................. B32B 5/08 |
| | | 181/290 |
| 2011/0026757 A1* | 2/2011 | Takahashi ............. H04R 7/125 |
| | | 381/397 |
| 2014/0046002 A1* | 2/2014 | Tavares ................ C08G 18/324 |
| | | 213/40 R |
| 2016/0234617 A1 | 8/2016 | Zechner et al. |
| 2018/0134855 A1* | 5/2018 | Vielsack .................... C08J 3/24 |
| 2019/0098423 A1 | 3/2019 | Zechner et al. |
| 2021/0120340 A1* | 4/2021 | Wang ...................... B32B 25/20 |
| 2021/0258707 A1* | 8/2021 | Wang ...................... B32B 27/08 |
| 2021/0324126 A1* | 10/2021 | Usui ........................ C08L 23/22 |
| 2021/0340361 A1* | 11/2021 | Anantha ................... B32B 1/08 |

FOREIGN PATENT DOCUMENTS

| | | | |
|---|---|---|---|
| CN | 205610915 U | | 9/2016 |
| CN | 107708051 A | | 2/2018 |
| CN | 108551640 A | | 9/2018 |
| CN | 108586715 A | | 9/2018 |
| CN | 108900960 A | | 11/2018 |
| CN | 109005487 A | * | 12/2018 |
| CN | 105188000 B | | 7/2019 |
| CN | 109005487 B | | 3/2020 |
| DE | 102017202624 A | * | 8/2018 |
| DE | 102017202624 A1 | | 8/2018 |
| EP | 0295494 A2 | | 12/1988 |
| KR | 101461410 B1 | | 11/2014 |
| WO | 2018149718 A1 | | 8/2018 |
| WO | 2019071970 A1 | | 4/2019 |

\* cited by examiner

DIAPHRAGM FOR MICROSPEAKER AND MANUFACTURING METHOD THEREOF

TECHNICAL FIELD

The present invention relates to the technical field of acoustic devices, and in particular to a diaphragm for a microspeaker and a method of manufacturing a diaphragm for a microspeaker.

BACKGROUND

With the rapid development of the mobile phone industry, the customer's demands for mobile multimedia applications is increasing, and the requirement for the quality of mobile phone sounds has been further increased. As a sound-producing part of the mobile phone, the quality of microspeaker directly determines the quality of the multimedia of the mobile phone. The principle of producing a sound by a microspeaker is that the voice coil drives a diaphragm to vibrate under the effect of an electromagnetic force, which then pushes air to produce sound. The role of the diaphragm is to push the air, provide damping, and maintain a fast response during vibration. The vibration stability of the diaphragm directly determines the sound quality of the microspeaker.

Firstly, the diaphragm for a microspeaker should have certain rigidity and strength to produce high sound pressure and wide frequency coverage. Secondly, the diaphragm for a microspeaker should be highly damped to have a smooth frequency response. Thirdly, the diaphragm for a microspeaker should have high resilience performance to have a large amplitude, so that the speaker has a high volume. However, it is difficult to find a material that has both high rigidity and good damping properties. It is generally necessary to compromise on the rigidity and damping properties of the membrane material, or to combine a rigid material with a highly damping material. In addition, it is difficult to find a material with high rigidity, high strength and high resilience at the same time.

The present diaphragms of microspeakers usually make use of a single-layer film of plastic materials, including, for example, a polypropylene (PP) film, a polyethylene terephthalate (PET) film, a polyimide (PI) film, a polyethylene naphthalate (PEN) film, a polyetheretherketone (PEEK) film or the like. These plastic materials have a high glass transition temperature Tg, which can maintain high rigidity and maintain the shape of the diaphragm at a higher operating temperature. They can also generate high sound pressures over a wide frequency range. However, if the glass transition temperature Tg of the diaphragm material is too high, it will increase the difficulty of the thermoforming process during the preparation of the diaphragm because the temperature of the thermoforming needs to be higher than the glass transition temperature Tg of the plastic material.

With the increase of the end user's requirements for the sound quality and volume of microspeakers, a multi-layer composite film structure including a plastic film as described above has gradually appeared, including a three-layer film, a five-layer film and a seven-layer film or the like. In the design of the multilayer film structure, a damping adhesive layer is used, whose main functions are to improve the stability of the diaphragm, control f0 of the diaphragm and reduce distortion, thereby improving the sound quality. The commonly used materials for the damping adhesive layer include an acrylic damping adhesive, a silicone damping pressure-sensitive adhesive, and the like. The multi-layer diaphragm with a damping layer can have a smoother frequency response. However, due to the rigidity of the plastic film in the diaphragm, the elasticity of the diaphragm is poor and the applicable amplitude (volume) thereof is small.

The thermoplastic elastomer materials have better resilience performance, which can increase the amplitude of the diaphragm and improve the water resistance and air tightness thereof. However, the thermoplastic elastomer materials are difficult to be used as a diaphragm material because they are only physical cross-linked, which results in relatively poor fatigue resistance and relatively poor high temperature resistance.

At present, there is still a huge demand in the industry for a diaphragm for a microspeaker that may be manufactured by a simple manufacturing process, and has good resilience, high rigidity and high strength. Therefore, it is of great significance to develop a diaphragm for a microspeaker that is easy to be prepared by thermoforming, and has appropriate modulus, good strength, elasticity, and thermal stability.

SUMMARY OF THE INVENTION

In view of the technical problem set forth above, an object of the present invention is to provide a diaphragm for a microspeaker and a manufacturing method thereof. The diaphragm for a microspeaker according to the technical solution of the present invention is easy to be prepared by thermoforming, and has appropriate modulus, good strength, elasticity, and thermal stability.

The present inventors have completed the present invention through intensive research.

According one aspect of the invention, there provides a diaphragm for a microspeaker, the diaphragm being a single-layer diaphragm or a multi-layer diaphragm and comprising at least one layer of a chemically cross-linked thermoplastic polyester elastomer, wherein: the chemically cross-linked thermoplastic polyester elastomer has a loss factor less than or equal to 0.4 at a temperature range not higher than a softening temperature of thermoplastic polyester elastomer before chemical crosslinking plus 40° C., as measured by a rheological curve; and the diaphragm further has a yield strain in the range of 7% to 30%.

According another aspect of the invention, there provides a method of manufacturing a diaphragm for a microspeaker, comprising subjecting a thermoplastic polyester elastomer film to a chemical crosslinking treatment, wherein: the chemically cross-linked thermoplastic polyester elastomer has a loss factor less than or equal to 0.4 at a temperature range not higher than a softening temperature before crosslinking of the thermoplastic polyester elastomer plus 40° C., as measured by a rheological curve; and the diaphragm further has a yield strain in the range of 7% to 30%.

The advantages of the present invention over the prior art in the field are that the diaphragm for a microspeaker according to the technical solution of the present invention is easy to be prepared by thermoforming, and has appropriate modulus, good strength, elasticity, and thermal stability.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE INVENTION

Figure 1:
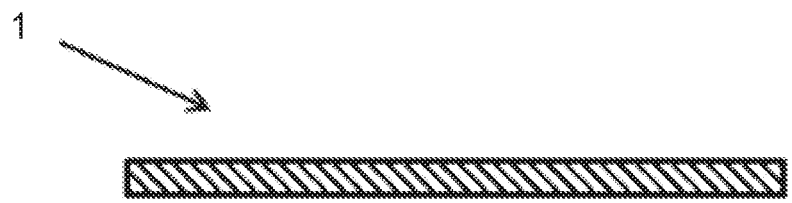
FIG. 1 shows a schematic cross-sectional view of a diaphragm for a microspeaker having a single-layer structure according to an embodiment of the present invention.

The present invention will be further described in detail below in conjunction with the drawings and specific embodiments. It will be appreciated that other embodiments may be practiced without departing from the scope or spirit of the invention. Therefore, the following detailed description is non-limiting.

All numbers indicating the sizes, quantities, and physicochemical properties of a feature used in the specification and claims, unless otherwise indicated, are understood to be modified in all instances by the term "about". Accordingly, the numerical parameters set forth in the above description and the appended claims are approximations unless otherwise indicated, and those skilled in the field are able to use the teachings disclosed herein. The range of values defined by endpoints includes all numbers in the range and any range within the range, for example, 1 to 5 includes 1, 1.1, 1.3, 1.5, 2, 2.75, 3, 3.80, 4, and 5, or the like.

The inventors of the present invention have found in research that some thermoplastic elastomeric materials can be used for the diaphragm for a microspeaker after being thermoformed. The thermoplastic elastomer materials can greatly improve the resilience and consistency of the diaphragm and can achieve high amplitude vibration. However, the thermoplastic elastomer materials generally have poor temperature resistance and cannot withstand larger power or higher working temperature. In addition, the thermoplastic elastomer materials have poor creep resistance (strength) and do not have the mechanical properties demanded by the long-term vibration of a diaphragm. According to the technical solution of the present invention, by subjecting a specific thermoplastic polyester elastomer material to a chemical crosslinking treatment (preferably, by using electron beam radiation), the thermoplastic polyester elastomer material may be cross linked. Therefore, the thermal stability and creep resistance of the diaphragm made of the material are greatly improved without substantially affecting its elastic property.

Specifically, according to an aspect of the invention, there provides a diaphragm for a microspeaker, the diaphragm being a single-layer diaphragm or a multi-layer diaphragm and comprising at least one layer of a chemically cross-linked thermoplastic polyester elastomer, wherein: the chemically cross-linked thermoplastic polyester elastomer has a loss factor less than or equal to 0.4 at a temperature range not higher than a softening temperature of thermoplastic polyester elastomer before chemical crosslinking plus 40° C., as measured by a rheological curve; and the diaphragm further has a yield strain in the range of 7% to 30%.

According to the technical solution of the present invention, the term "thermoplastic polyester elsatomer" (TPEE), also known as a thermoplastic polyether ester elastomer, refers to a block copolymer containing polyester hard segments and polyether soft segments. In the thermoplastic polyester elsatomer, the soft segments and the uncrystallized hard segments form an amorphous phase, and a part of the hard segment crystallizes to form crystalline microdomains, which function as physical crosslinking points.

According to the technical solution of the present invention, the term "chemically cross-linked thermoplastic polyester elastomer" refers to a chemically cross-linked thermoplastic polyester elastomer formed by subjecting a thermoplastic polyester elastomer used for making a diaphragm to a chemical crosslinking treatment. The chemical crosslinking treatment forms a cross-linked network structure inside the thermoplastic polyester elastomer via chemical crosslinking points formed by chemical bonds, and because of this, the chemically cross-linked thermoplastic polyester elastomer does not have thermoplasticity. That is, the chemically cross-linked thermoplastic polyester elastomer is not a thermoplastic elastomer.

Preferably, in the diaphragm, the chemically cross-linked thermoplastic polyester elastomer has a loss factor (that is, a damping value) tan δ less than 0.2 at a temperature range not higher than a softening temperature of thermoplastic polyester elastomer before chemical crosslinking plus 40° C., as measured by a rheological curve.

The "rheological curve" according to the present invention is measured by using an Ares G2 Rotary Rheometer produced by the TA Company in USA, in which an 8-inch parallel plate clamp is used to hold a chemically cross-linked thermoplastic polyester elastomer sample have a thickness of 1 mm, and when the heating rate is 5° C./min, the testing frequency is 1 Hz, and the strain is less than or equal to 1%, rheological measurement is performed at different temperature points to obtain the storage modulus G' and the loss modulus G", and further according to the following formula, the loss factor value (that is, the damping value) tan δ is calculated from the storage modulus G' and the loss modulus G".

$$\tan \delta = G''/G'$$

According to the above formula, when the thermoplastic polyester elastomer is chemically cross-linked and when the chemically cross-linked thermoplastic polyester elastomer has a loss factor less than or equal to 0.4, preferably less than 0.2 at a temperature of a softening temperature before crosslinking of the thermoplastic polyester elastomer plus 40° C., as measured by a rheological curve, it may be indicated that the chemically cross-linked thermoplastic polyester elastomer has good thermal stability (that is, thermal damping stability).

In order to meet the basic use of a diaphragm, the chemically cross-linked thermoplastic polyester elastomer has appropriate mechanical properties (including strength and elasticity). For a microspeaker having an output power greater than or equal to 1 w, the diaphragm has a tensile modulus in a range of 150 MPa to 1000 MPa. By controlling the tensile modulus of the diaphragm within the above range, the basic function of the diaphragm to drive air to generate sound can be achieved, and the stability and consistency of the device's operation over a long time and a wide frequency range can be guaranteed.

The diaphragm has a thickness in a range of 5 μm to 100 μm, preferably 10 to 75 μm and more preferably 15 to 50 μm.

In order to facilitate the production of the diaphragm by thermoforming (for example, hot extrusion), preferably, the thermoplastic polyester elastomer has a softening temperature before crosslinking of 200° C. or lower.

More preferably, the thermoplastic polyester elastomer has a softening temperature before crosslinking in a range of 120° C. to 200° C.

There is no particular limitation on the specific type of thermoplastic polyester elastomer (TPEE) which can be used in the present invention, as long as it has a crosslinkable structure in the molecule thereof (including a structure having a crosslinkable group or a structure that can be broken and cross-linked by electron beam irradiation). Preferably, the thermoplastic polyester elastomer meets the above requirements regarding the softening temperature range.

There is no specific restriction on the thermoplastic polyester elastomer (TPEE) that can be used in the present invention, which can be prepared by the known methods according to the prior art references or can also be obtained commercially. The commercially available products of the thermoplastic polyester elastomer (TPEE) that can be used in the present invention include: RITEFLEX from Ticona, HYTREL from DuPont, ECDEL from Eastman, ARNITEL from DSM, and SUNPRENE from Chenguang Kexin Company.

The TPEE products of HYTREL series from Dupont Company are also suitable for the present invention. The TPEE products of HYTREL series include a block copolymer composed of crystalline hard segments of polybutylene terephthalate (PBT) and polyether soft segments based on a long-chain polytetrahydrofuran. Specifically, the products include HYTREL 5556, HYTREL 6356, HYTREL 7246, and HYTREL 8238 produced by DuPont.

In addition, the thermoplastic polyester elastomer TPEE D63 produced by Shibata Company is also suitable for the present invention.

For the diaphragm to have further improved thermal stability while having good strength and elasticity, the thermoplastic polyester elastomer constituting the diaphragm must undergo a chemical crosslinking treatment. The method for chemically crosslinking the thermoplastic polyester elastomer is not particularly limited and the conventional physical and chemical methods can be used, such as electron beam radiation crosslinking, microwave radiation crosslinking, ultraviolet radiation crosslinking, chemical crosslinking, and the like.

Preferably, the thermoplastic polyester elastomer is cured by radiating electron beam. The electron beam radiation comprises radiating the thermoplastic polyester elastomer using an electron beam having electron beam energy of 100 to 300 KV for an electron beam dose of 3 to 12 Mrad so as to destroy the weak portions of the thermoplastic polyester elastomer molecules and cause crosslinking through chemical bonds.

According to the technical solution of the present invention, in order to further improve the elasticity of the diaphragm to provide vibration with high sensitivity, consistency, and high amplitude according to the actual situation, preferably, the sound film has a folding structure. There is no particular limitation on the folding structure that can be used in the present invention, and it may be one or a combination of the folding structures that the diaphragm in the field of microspeakers has.

According to a specific embodiment of the present invention, the sound film is a single-layer diaphragm. FIG. 1 shows a schematic cross-sectional view of a diaphragm 1 for a microspeaker having a single-layer structure according to an embodiment of the present invention. The diaphragm 1 is composed of the chemically cross-linked thermoplastic polyester elastomer as described above.

Figure 2:
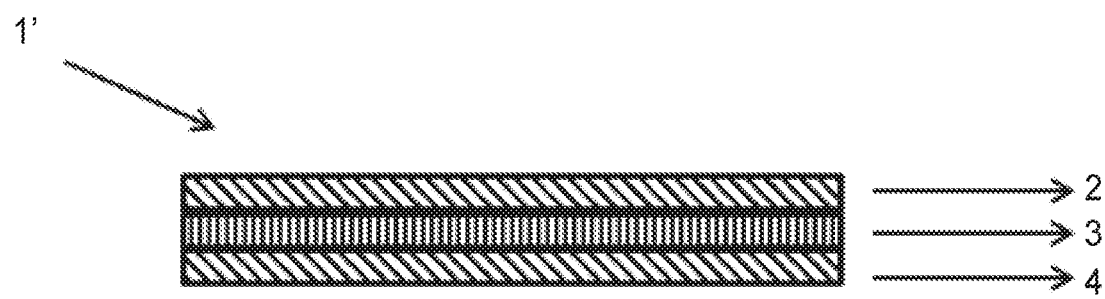
FIG. 2 shows a schematic cross-sectional view of a multi-layer diaphragm for a microspeaker having a three-layer structure according to another embodiment of the present invention.

According to another specific embodiment of the present invention, the diaphragm is a three-layer diaphragm. FIG. 2 shows a schematic cross-sectional view of a multi-layer diaphragm 1' for a microspeaker having a three-layer structure according to another embodiment of the present invention. The multi-layer diaphragm 1' includes a first surface layer 2, a damping layer 3, and a second surface layer 4 in order. Both of the first surface layer 2 and the second surface layer 4 are composed of the chemically cross-linked thermoplastic polyester elastomer as described above. Preferably, the damping layer 3 is one or more selected from a group consisting of a silicone damping adhesive layer, an acrylic damping adhesive layer and a polyolefin damping adhesive layer. The specific types of the silicone damping adhesive, the acrylic damping adhesive and the polyolefin damping adhesive that can be used in the present invention are not particularly limited, and they can be selected by those skilled in the art based on their conventional knowledge. The three-layer diaphragm has a thickness in the range of 30 to 100 μm, preferably 36 to 80 μm, and more preferably 42 to 60 μm. Preferably, the first surface layer 2 and the second surface layer 4 each independently has a thickness in a range of 5-30 μm, preferably 7-20 μm and more preferably 10-15 μm, and the damping layer 3 has a thickness in the range of 5-60 μm, preferably 10-40 μm and more preferably 12-30 μm.

Figure 3:
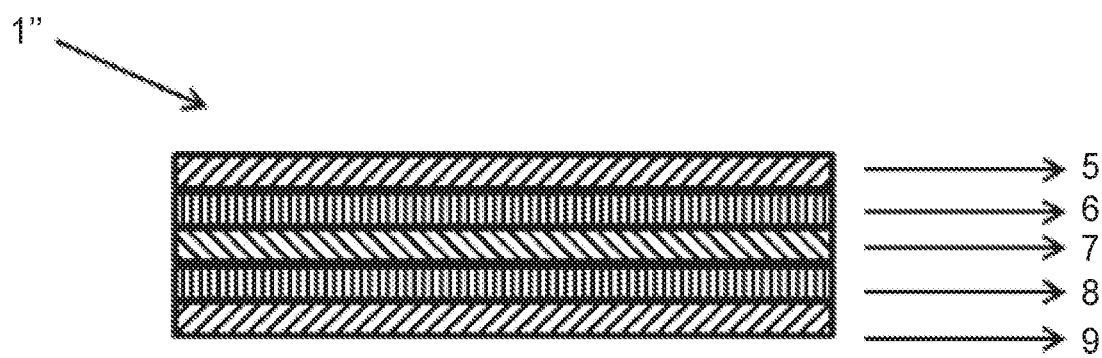
FIG. 3 shows a schematic cross-sectional view of a multi-layer diaphragm for a microspeaker having a five-layer structure according to still another embodiment of the present invention.

According to another specific embodiment of the present invention, the diaphragm is a five-layer diaphragm. FIG. 3 shows a schematic cross-sectional view of a multi-layer diaphragm 1" for a microspeaker having a five-layer structure according to still another embodiment of the present invention. The multilayer sound film 1" includes a first skin layer 5, a first damping adhesive layer 6, an inner layer 7, a second damping adhesive layer 8 and a second skin layer 9 in this order. The inner layer 7 is composed of the chemically cross-linked thermoplastic polyester elastomer as described above. Preferably, the first skin layer 5 and the second skin layer 9 may be the same or different and are each independently composed of the chemically cross-linked thermoplastic polyester elastomer as described above, which preferably has a tensile modulus of 150 MPa to 1000 MPa. The diaphragm has a yield strain of 7% to 30%. The first damping adhesive layer 6 and the second damping adhesive layer 8 may be the same or different, and are each independently selected from a group consisting of a silicone damping adhesive layer, an acrylic damping adhesive layer and a polyolefin damping adhesive layer. Preferably, the materials of the first damping adhesive layer 6 and the second damping adhesive layer 8 are the same as or different from those of the above-mentioned damping layer 3. The thickness of the five-layer structured diaphragm is 30 to 100 μm, preferably 42 to 60 μm. The first skin layer 5 and the second skin layer 9 each independently has a thickness of 3-10 μm, preferably 5-9 μm; the first damping adhesive layer 6 and the second damping adhesive layer 8 each independently has a thickness of 5-30 μm, preferably 10-20 μm; and the inner layer has a thickness of 5 to 30 μm, preferably 10-20 μm.

According to another aspect of the invention, there provides a method of manufacturing a diaphragm for a microspeaker, comprising subjecting a thermoplastic polyester elastomer film to a chemical crosslinking treatment.

For the diaphragm to have further improved thermal stability while having good strength and elasticity, the thermoplastic polyester elastomer constituting the diaphragm has been chemical cross-linked. The chemical crosslinking treatment forms a cross-linked network structure inside the thermoplastic polyester elastomer via chemical crosslinking points formed by chemical bonds, and because of this, the chemically cross-linked thermoplastic polyester elastomer does not have thermoplasticity.

Preferably, the thermoplastic polyester elastomer is a thermoplastic polyester elastomer having a softening temperature before crosslinking of 200° C. or lower.

More preferably, the thermoplastic polyester elastomer is a thermoplastic polyester elastomer having a softening temperature before crosslinking in a range of 120° C. to 200° C.

The thermoplastic polyester elastomer film according to the present invention can be prepared by molding a thermoplastic polyester elastomer into a film by a method known in the art.

There is no particular limitation on the specific type of thermoplastic polyester elastomer which can be used in the present invention, as long as it meets the above requirements on the softening temperature range and has a crosslinkable structure in the molecule thereof (including a structure having a crosslinkable group or a structure that can be broken and cross-linked by electron beam irradiation).

There is no specific restriction on the thermoplastic polyester elastomer (TPEE) that can be used in the present invention, which can be prepared by the known methods according to the prior art references or can also be obtained commercially. The commercially available products of the thermoplastic polyester elastomer (TPEE) that can be used in the present invention include: HYTREL 5556, HYTREL 6356, HYTREL 7246, and HYTREL 8238 produced by Dupont Company; and a thermoplastic polyester elastomer TPEE D63 produced by Shibata Company.

The method for chemically crosslinking the thermoplastic polyester elastomer is not particularly limited and the conventional physical and chemical methods can be used, such as electron beam radiation crosslinking, microwave radiation crosslinking, ultraviolet radiation crosslinking, chemical crosslinking, and the like.

Preferably, the thermoplastic polyester elastomer is cured by radiating electron beam. The electron beam radiation comprises radiating the thermoplastic polyester elastomer using an electron beam having electron beam energy of 100 to 300 KV for an electron beam dose of 3 to 12 Mrad so as to destroy the weak portions of the thermoplastic polyester elastomer molecules and cause crosslinking through chemical bonds.

In order to make the diaphragm have a certain shape, the thermoplastic polyester elastomer constituting the diaphragm may also be subjected to a thermoforming treatment, which may be performed before the chemical crosslinking treatment or after the chemical crosslinking treatment.

The diaphragm may be a single-layer diaphragm or a multi-layer diaphragm. The multilayer film includes at least one chemically cross-linked thermoplastic polyester elastic film, at least one damping film, and at least three layers in total, and the modulus thereof is between 150 MPa and 1000 MPa.

Preferably, the thickness of the chemically cross-linked thermoplastic polyester elastomer film is in a range of 5 to 100 μm.

According to a specific embodiment of the present invention, there provides a method for preparing a multi-layer diaphragm having a three-layer structure. First, a multi-layer diaphragm 1' is prepared by a lamination method, wherein the multi-layer diaphragm 1' includes a first surface layer 2, a damping layer 3, and a second surface layer 4 in order. Both of the first surface layer 2 and the second surface layer 4 are composed of the chemically cross-linked thermoplastic polyester elastomer as described above. Preferably, the damping layer 3 is one or more selected from a group consisting of a silicone damping adhesive layer, an acrylic damping adhesive layer and a polyolefin damping adhesive layer. The specific types of the silicone damping adhesive, the acrylic damping adhesive and the polyolefin damping adhesive that can be used in the present invention are not particularly limited, and they can be selected by those skilled in the art based on their conventional knowledge. The three-layer diaphragm has a thickness in the range of 30 to 100 μm, preferably 36 to 80 μm, and more preferably 42 to 60 μm. Preferably, the first surface layer 2 and the second surface layer 4 each independently has a thickness in a range of 5-30 μm, preferably 7-20 μm and more preferably 10-15 μm, and the damping layer 3 has a thickness in the range of 5-60 μm, preferably 10-40 μm and more preferably 12-30 μm. The diaphragm has a tensile modulus in a range of 150 MPa to 1000 MPa and an elongation at break in a range of 40% to 300%.

For a microspeaker having an output power greater than or equal to 1 w, a single-layer diaphragm or multi-layer diaphragm having a tensile modulus in the range of 150 MPa to 1000 MPa is preferred.

According to another specific embodiment of the present invention, there provides a method for preparing a multi-layer diaphragm having a five-layer structure. First, a multi-layer diaphragm 1" is prepared by a lamination method, wherein the multilayer sound film 1" includes a first skin layer 5, a first damping adhesive layer 6, an inner layer 7, a second damping adhesive layer 8 and a second skin layer 9 in this order. The inner layer 7 is composed of the chemically cross-linked thermoplastic polyester elastomer as described above. Preferably, the first skin layer 5 and the second skin layer 9 may be the same or different, and are each independently selected from a thermoplastic polyester elastic material layer as described in the invention, which preferably has a tensile modulus of 150 MPa to 1000 MPa and a yield strain of 7% to 30%. The first damping adhesive layer 6 and the second damping adhesive layer 8 are the same or different, and are each independently selected from a group consisting of a silicone damping adhesive layer, an acrylic damping adhesive layer and a polyolefin damping adhesive layer. Preferably, the materials of the first damping adhesive layer 6 and the second damping adhesive layer 8 are the same as or different from those of the above-mentioned damping layer 3. The thickness of the five-layer structured diaphragm is 30 to 100 μm, preferably 42 to 60 μm. The first skin layer 5 and the second skin layer 9 each independently has a thickness of 3-10 μm, preferably 5-9 μm; the first damping adhesive layer 6 and the second damping adhesive layer 8 each independently has a thickness of 5-30 μm, preferably 10-20 μm; and the inner layer has a thickness of 5 to 30 μm, preferably 10-20 μm.

The various exemplary embodiments of the present invention are further illustrated by the following list of embodiments, which should not be construed as unduly limiting the present invention.

Embodiment 1 is a diaphragm for a microspeaker, the diaphragm being a single-layer diaphragm or a multi-layer diaphragm and comprising at least one layer of a chemically cross-linked thermoplastic polyester elastomer, wherein: the chemically cross-linked thermoplastic polyester elastomer has a loss factor less than or equal to 0.4 at a temperature range not higher than a softening temperature of thermoplastic polyester elastomer before chemical crosslinking plus 40° h, as measured by a rheological curve; and the diaphragm further has a yield strain in the range of 7% to 30%.

Embodiment 2 is the diaphragm according to Embodiment 1, wherein the chemically cross-linked thermoplastic polyester elastomer has a loss factor less than 0.2 at a temperature range not higher than a softening temperature of thermoplastic polyester elastomer before chemical crosslinking plus 40° t, as measured by a rheological curve.

Embodiment 3 is the diaphragm according to Embodiment 1, the chemically cross-linked thermoplastic polyester elastomer has a softening temperature before crosslinking of 200° C. or lower.

Embodiment 4 is the diaphragm according to any one of Embodiments 1-3, wherein the chemically cross-linked thermoplastic polyester elastomer has a softening temperature before crosslinking in a range of 120° C. to 200° C.

Embodiment 5 is the diaphragm according to any one of Embodiments 1-4, wherein the diaphragm has a tensile modulus in a range of 150 MPa to 1000 MPa.

Embodiment 6 is the diaphragm according to any one of Embodiments 1-5, wherein the diaphragm has a thickness in a range of 5 μm to 100 μm.

Embodiment 7 is the diaphragm according to any one of Embodiments 1-6, wherein the chemically cross-linked thermoplastic polyester elastomer is cross-linked by radiation.

Embodiment 8 is the diaphragm according to Embodiment 7, wherein the chemically cross-linked thermoplastic polyester elastomer is cross-linked by radiating electron beam.

Embodiment 9 is the diaphragm according to any one of Embodiments 1-4, wherein the multi-layer diaphragm is a diaphragm having three layers.

Embodiment 10 is the diaphragm according to any one of Embodiments 1-9, wherein the multi-layer diaphragm further includes a damping layer.

Embodiment 11 is the diaphragm according to Embodiment 10, wherein the damping layer is one or more selected from a group consisting of a silicone damping adhesive layer, an acrylic damping adhesive layer and a polyolefin damping adhesive layer.

Embodiment 12 is the diaphragm according to Embodiment 10, wherein the multi-layer diaphragm has a thickness in a range of 10 μm to 100 μm.

Embodiment 13 is a method of manufacturing a diaphragm for a microspeaker, comprising subjecting a thermoplastic polyester elastomer film to a chemical crosslinking treatment, wherein: the chemically cross-linked thermoplastic polyester elastomer has a loss factor less than or equal to 0.4 at a temperature range not higher than a softening temperature before crosslinking of the thermoplastic polyester elastomer plus 40° C., as measured by a rheological curve; and the diaphragm further has a yield strain in the range of 7% to 30%.

Embodiment 14 is the method of manufacturing a diaphragm for a microspeaker according to Embodiment 13, wherein the chemically cross-linked thermoplastic polyester elastomer has a loss factor less than 0.2 at a temperature range not higher than a softening temperature before crosslinking of the thermoplastic polyester elastomer plus 40° C., as measured by a rheological curve.

Embodiment 15 is the method of manufacturing a diaphragm for a microspeaker according to any one of Embodiments 13-14, wherein the thermoplastic polyester elastomer is a thermoplastic polyester elastomer having a softening temperature before crosslinking of 200° C. or lower.

Embodiment 16 is the method of manufacturing a diaphragm for a microspeaker according to any one of Embodiments 13-15, wherein the thermoplastic polyester elastomer is a thermoplastic polyester elastomer having a softening temperature before crosslinking in a range of 120° C. to 200° C.

Embodiment 17 is the method of manufacturing a diaphragm for a microspeaker according to any one of Embodiments 13-16, wherein the chemical crosslinking treatment comprises crosslinking the thermoplastic polyester elastomer film by radiation.

Embodiment 18 is the method of manufacturing a diaphragm for a microspeaker according to Embodiment 17, wherein the chemical crosslinking treatment comprises crosslinking the thermoplastic polyester elastomer film by radiating electron beam.

Embodiment 19 is the method of manufacturing a diaphragm for a microspeaker according to Embodiment 18, wherein the crosslinking by radiating electron beam comprises radiating the thermoplastic polyester elastomer film using an electron beam having electron beam energy of 100 to 300 KV for an electron beam dose of 3 Mrad to 12 Mrad.

Embodiment 20 is the method of manufacturing a diaphragm for a microspeaker according to any one of Embodiments 13-19, wherein the chemically cross-linked thermoplastic polyester elastomer film has a thickness in a range of 5 μm to 100 μm.

Embodiment 21 is the method of manufacturing a diaphragm for a microspeaker according to any one of Embodiments 13-20, wherein after the step of subjecting a thermoplastic polyester elastomer film to a chemical crosslinking treatment, the diaphragm has a tensile modulus in a range of 150 MPa to 1000 MPa.

Embodiment 22 is the method of manufacturing a diaphragm for a microspeaker according to any one of Embodiments 13-21, wherein the diaphragm is a single-layer diaphragm or a multi-layer diaphragm comprising at least one layer of a chemical cross-linked thermoplastic polyester elastomer.

Embodiment 23 is the method of manufacturing a diaphragm for a microspeaker according to Embodiment 22, wherein the multi-layer diaphragm is a diaphragm having three layers.

Embodiment 24 is the method of manufacturing a diaphragm for a microspeaker according to Embodiment 23, wherein the multi-layer diaphragm further includes a damping layer, and the damping layer is one or more selected from a group consisting of a silicone damping adhesive layer, an acrylic damping adhesive layer and a polyolefin damping adhesive layer.

The invention will be described in greater detail with reference to the embodiments. It is to be understood that the description and examples are intended to be illustrative, and not restrictive. The scope of the invention is defined by the appended claims.

EXAMPLES

In the present invention, unless otherwise indicated, the reagents employed were all commercially available and used directly without further purification.

The raw materials used in the examples and comparative examples according to the present invention are as shown in Table 1 below. Unless otherwise indicated, the raw materials were used directly without additional purification.

TABLE 1

List of raw materials

| Components | Chemical Name | Product Name | Manufacturer |
|---|---|---|---|
| | Thermoplastic polyester elastomer | TPEE D63 softening temperature: 160° C. | Shibata Company, Japan |
| | Thermoplastic polyester elastomer | HYTREL 5556 softening temperature: 160° C. | Dupont Company, USA |
| | Thermoplastic polyester elastomer | HYTREL 6356 softening temperature: 165° C. | Dupont Company, USA |
| | Thermoplastic polyester elastomer | HYTREL 7246 softening temperature: 170° C. | Dupont Company, USA |
| | Thermoplastic polyester elastomer | HYTREL 8238 softening temperature: 180° C. | Dupont Company, USA |
| Material of damping layer | Silicone damping adhesive | PSA 6574 | Momentive Company, USA |
| | Acrylic damping adhesive | 3M 2567 ATT | 3M Innovative Properties Company, USA |
| | Polyolefin damping adhesive | Absortomer EP1001 | Mitsu Chemical Company, Japan |

* The softening temperature of the thermoplastic polyester elastomer was obtained by measuring the rheological curve with a rotary rheometer.

Testing Methods

Tensile Modulus and Elongation at Break

A universal testing machine produced by Instron Company was used to measure the tensile modulus (unit: MPa) and elongation at break (unit: %) of respective diaphragm samples prepared in the following examples, wherein the fixture force of the universal testing machine was 100 N, the diaphragm samples were 50 mm×25.4 Inch, and the testing speed was 50 mm/min.

According to the invention, when a diaphragm sample had a tensile modulus greater than or equal to 150 MPa and an elongation at break greater than 70%, the diaphragm sample is considered to meet the basic requirements.

Yield Strain

A universal testing machine produced by Instron Company was used to measure the tensile modulus (unit: MPa) and elongation at break (unit: %) of respective diaphragm samples prepared in the following examples, wherein the fixture force of the universal testing machine was 100 N, the diaphragm samples were 50 mm×25.4 Inch, and the testing speed was 50 mm/min.

A stress-strain curve obtained from the above process is achieved and observed to see whether there is yield in the stress-strain curve, if so, calculate the yield strain value (%).

Rheological Curve

The properties concerning rheological curves of the single-layer diaphragm samples prepared in the following examples 1-5 were measured according to the following method to investigate the changing degrees in the damping properties thereof.

Specifically, the rheological curve was measured by using an Ares G2 Rotary Rheometer produced by the TA Company from USA. First, each of respective diaphragm samples having a thickness of 1 mm was held by an 8-inch parallel plate clamp, and when the heating rate was 5° C./min, the testing frequency was 1 Hz, and the strain was less than or equal to 1%, rheological measurement was performed at different temperature points to obtain the storage modulus G' and the loss modulus G", and further according to the following formula, the loss factor value (that is, the damping value) tan δ was calculated from the storage modulus G' and the loss modulus G":

$$\tan \delta = G''/G'$$

Example 1

The thermoplastic polyester elastomer TPEE D63 produced by Shibata Company was hot extruded by an extruder into a single-layer film having a thickness of 15 μm. This single-layer film was divided into four parts: Film A, Film B, Film C and Film D. Then, Film B was irradiated by using an electron beam having electron beam energy of 150 KV for an electron beam dose of 3 Mrad; Film C was irradiated by using an electron beam having electron beam energy of 150 KV for an electron beam dose of 6 Mrad by using the same laser; and Film D was irradiated by using an electron beam having electron beam energy of 150 KV for an electron beam dose of 12 Mrad by using the same laser.

Then, the Film A, Film B, Film C and Film D were measured according to the methods described above for measuring the tensile modulus, elongation at break, yield strain, and rheological curve respectively, wherein the measurement for rheological curve was performed at 180° C., 190° C., 200° C., 210° C. and 220° C., respectively. The test results are shown in Table 2 below.

TABLE 2

| | Film A (No electron beam radiation) | Film B (Electron beam radiation: 150 KV; 3 Mrad)) | Film C Electron beam radiation: 150 KV; 6 Mrad) | Film D Electron beam radiation: 150 KV; 12 Mrad) |
|---|---|---|---|---|
| Tensile modulus (MPa) | 580 MPa | 600 Mpa | 550 MPa | 370 MPa |
| Yield strain (%) | 13% | 11% | 8% | 7% |
| Elongation at break (%) | 250% | 140% | 70% | 40% |
| Tan δ @180° C. | 0.15 | 0.15 | 0.14 | 0.11 |
| Tan δ @190° C. | 0.17 | 0.15 | 0.14 | 0.11 |
| Tan δ @200° C. | 0.27 | 0.22 | 0.17 | 0.12 |
| Tan δ @210° C. | 1.23 | 0.56 | 0.26 | 0.12 |
| Tan δ @220° C. | 3.53 | 1.89 | 0.41 | 0.12 |

Example 2

The thermoplastic polyester elastomer HYTREL 5556 produced by Dupont Company was hot extruded by an extruder into a single-layer film having a thickness of 30 μm. This single-layer film was divided into three parts: Film A, Film B, and Film C. Then, Film B was irradiated by using an electron beam having electron beam energy of 150 KV for an electron beam dose of 3 Mrad. In addition, Film C was irradiated by using an electron beam having electron beam energy of 150 KV for an electron beam dose of 6 Mrad by using the same laser.

Then, the Film A, Film B, and Film C were measured according to the methods described above for measuring the tensile modulus, elongation at break, yield strain, and rheological curve respectively, wherein the measurement for rheological curve was performed at 180° C., 190° C., 200° C., 210° C. and 220° C., respectively. The test results are shown in Table 3 below.

TABLE 3

|  | Film A (No electron beam radiation) | Film B (Electron beam radiation: 150 KV; 3 Mrad) | Film C (Electron beam radiation: 150 KV; 6 Mrad) |
| --- | --- | --- | --- |
| Tensile modulus (MPa) | 180 MPa | 200 Mpa | 150 MPa |
| Yield strain (%) | 33% | 30% | 25% |
| Elongation at break (%) | 350% | 330% | 250% |
| Tan δ @180° C. | 0.13 | 0.13 | 0.13 |
| Tan δ @190° C. | 0.14 | 0.14 | 0.13 |
| Tan δ @200° C. | 0.37 | 0.31 | 0.28 |
| Tan δ @210° C. | 2.35 | 1.35 | 0.47 |
| Tan δ @220° C. | 4.83 | 2.85 | 0.73 |

Example 3

The thermoplastic polyester elastomer HYTREL 6356 produced by Dupont Company was hot extruded by an extruder into a single-layer film having a thickness of 30 μm. This single-layer film was divided into three parts: Film A, Film B, and Film C. Then, Film B was irradiated by using an electron beam having electron beam energy of 150 KV for an electron beam dose of 3 Mrad. In addition, Film C was irradiated by using an electron beam having electron beam energy of 150 KV for an electron beam dose of 6 Mrad by using the same laser.

Then, the Film A, Film B, and Film C were measured according to the methods described above for measuring the tensile modulus, elongation at break, yield strain, and rheological curve respectively, wherein the measurement for rheological curve was performed at 180° C., 190° C., 200° C., 205° C., 210° C. and 220° C., respectively. The test results are shown in Table 4 below.

TABLE 4

|  | Film A (No electron beam radiation) | Film B (Electron beam radiation: 150 KV; 3 Mrad) | Film C (Electron beam radiation: 150 KV; 6 Mrad) |
| --- | --- | --- | --- |
| Tensile modulus(MPa) | 280 MPa | 290 Mpa | 270 MPa |
| Yield strain(%) | 28% | 23% | 20% |
| Elongation at break(%) | 300% | 270% | 230% |
| Tan δ @180° C. | 0.21 | 0.21 | 0.17 |
| Tan δ @190° C. | 0.24 | 0.23 | 0.19 |
| Tan δ @200° C. | 0.43 | 0.32 | 0.27 |
| Tan δ @205° C. | 0.58 | 0.39 | 0.33 |
| Tan δ @210° C. | 0.91 | 0.61 | 0.42 |
| Tan δ @220° C. | 2.45 | 1.78 | 0.65 |

Example 4

The thermoplastic polyester elastomer HYTREL 7246 produced by Dupont Company was hot extruded by an extruder into a single-layer film having a thickness of 30 μm. This single-layer film was divided into three parts: Film A, Film B, and Film C. Then, Film B was irradiated by using an electron beam having electron beam energy of 150 KV for an electron beam dose of 3 Mrad. In addition, Film C was irradiated by using an electron beam having electron beam energy of 150 KV for an electron beam dose of 6 Mrad by using the same laser.

Then, the Film A, Film B, and Film C were measured according to the methods described above for measuring the tensile modulus, elongation at break, yield strain, and rheological curve respectively, wherein the measurement for rheological curve was performed at 200° C., 210° C., 220° C., 230° C. and 240° C., respectively. The test results are shown in Table 5 below.

TABLE 5

|  | Film A (No electron beam radiation) | Film B (Electron beam radiation: 150 KV; 3 Mrad) | Film C (Electron beam radiation: 150 KV; 6 Mrad) |
| --- | --- | --- | --- |
| Tensile modulus (MPa) | 530 MPa | 530 Mpa | 510 MPa |
| Yield strain (%) | 20% | 17% | 13% |
| Elongation at break (%) | 210% | 170% | 110% |
| Tan δ @200° C. | 0.15 | 0.15 | 0.14 |
| Tan δ @210° C. | 0.37 | 0.33 | 0.15 |
| Tan δ @220° C. | 0.53 | 0.37 | 0.21 |
| Tan δ @230° C. | 1.78 | 0.71 | 0.39 |
| Tan δ @240° C. | 5.33 | 1.92 | 0.71 |

Example 5

The thermoplastic polyester elastomer HYTREL 8238 produced by Dupont Company was hot extruded by an extruder into a single-layer film having a thickness of 30 μm. This single-layer film was divided into three parts: Film A, Film B, and Film C. Then, Film B was irradiated by using an electron beam having electron beam energy of 150 KV for an electron beam dose of 3 Mrad. In addition, Film C was irradiated by using an electron beam having electron beam energy of 150 KV for an electron beam dose of 6 Mrad by using the same laser.

Then, the Film A, Film B, and Film C were measured according to the methods described above for measuring the tensile modulus, elongation at break, yield strain, and rheological curve respectively, wherein the measurement for rheological curve was performed at 200° C., 210° C., 220° C., 230° C. and 240° C., respectively. The test results are shown in Table 6 below.

TABLE 6

|  | Film A (No electron beam radiation) | Film B (Electron beam radiation: 150 KV; 3 Mrad) | Film C Electron beam radiation: 150 KV; 6 Mrad) |
| --- | --- | --- | --- |
| Tensile modulus (MPa) | 1100 MPa | 1000 Mpa | 900 MPa |
| Yield strain (%) | 15% | 11% | 7% |
| Elongation at break (%) | 110% | 100% | 80% |
| Tan δ @200° C. | 0.15 | 0.15 | 0.12 |
| Tan δ @210° C. | 0.29 | 0.27 | 0.12 |
| Tan δ @220° C. | 0.45 | 0.40 | 0.18 |
| Tan δ @230° C. | 1.24 | 0.66 | 0.33 |
| Tan δ @240° C. | 3.78 | 1.42 | 0.78 |

In the above Examples 1 to 5, the single-layer diaphragm samples were prepared by using one of the different thermoplastic polyester elastomers as a base material, respectively. From the results in Tables 2-6, it can be seen that when the diaphragm samples are cross-linked by an electron beam having electron beam energy of 150 KV for an electron beam dose of 3 Mrad, 6 Mrad or 12 Mrad, the tensile modulus of the diaphragm samples does not change much, indicating that the strength of the diaphragm samples were basically maintained; additionally, the yield strain and elongation at break of the diaphragm samples decreased, indicating that the elasticity of the diaphragm samples was reduced to a certain extent. In addition, it should be noted that when the diaphragm samples were cross-linked with electron beam energy of 150 KV for 3 Mrad, 6 Mrad or 12 Mrad, the loss factor value tan δ of the diaphragm samples at different time points remains basically unchanged, which proves that the diaphragm samples treated by electron beam crosslinking have excellent thermal stability.

Multi-layer diaphragms having a three-layer structure were prepared in the following Examples 6-10.

Example 6

The thermoplastic polyester elastomer TPEE D63 produced by Shibata Company was hot extruded by an extruder into a single-layer film having a thickness of 15 μm. The single-layer film was divided into two portions. Then, the obtained two TPEE D63 single-layer films were radiated by an electron beam having electron beam energy of 150 KV for an electron beam dose of 3.8 Mrad. A damping layer of an acrylic damping adhesive 3M 2567 ATT having a thickness of 20 μm was laminated between these two cross-linked TPEE D63 single-layer films to obtain a composite multi-layer diaphragm. The composite multi-layer diaphragm was thermoformed at 145° C. for 10 seconds. The composite multilayer diaphragm has a three-layer composite structure of a TPEE D63 elastomer layer (15 μm)/a 3M 2567 ATT damping layer (20 μm)/a TPEE D63 elastomer layer (15 μm). According to the measurements described above for measuring tensile modulus, elongation at break, yield strain, and rheological properties, the three-layer diaphragm has a tensile modulus of 330 MPa, a yield strain of 11% and an elongation at break of 180%. It can be known that the multilayer diaphragm having a three-layer composite structure has good strength, elasticity, and thermal stability.

Example 7

The thermoplastic polyester elastomer TPEE D63 produced by Shibata Company was hot extruded by an extruder into a single-layer film having a thickness of 15 μm. The single-layer film was divided into two portions. Then, the obtained two TPEE D63 single-layer films were radiated by an electron beam having electron beam energy of 150 KV for an electron beam dose of 3.8 Mrad. A damping layer of a silicone damping adhesive PSA 6574 having a thickness of 20 μm was laminated between these two cross-linked TPEE D63 single-layer films to obtain a composite multi-layer diaphragm. The composite multi-layer diaphragm was thermoformed at 145° C. for 10 seconds. The composite multilayer diaphragm has a three-layer composite structure of a TPEE D63 elastomer layer (15 μm)/a PSA 6574 damping layer (20 μm)/a TPEE D63 elastomer layer (15 μm). According to the measurements described above for measuring tensile modulus, elongation at break, yield strain, and rheological properties, the multilayer diaphragm has a tensile modulus of 180 MPa, a yield strain of 10% and an elongation at break of 170%. It can be known that the multilayer diaphragm having a three-layer composite structure has good strength, elasticity, and thermal stability. Although Example 6 and Example 7 used different damping materials, the elongation at break was enhanced.

Example 8

The thermoplastic polyester elastomer HYTREL 5556 produced by Dupont Company was hot extruded by an extruder into a single-layer film having a thickness of 15 μm. The single-layer film was divided into two portions. Then, the obtained two HYTREL 5556 single-layer films were radiated by an electron beam having electron beam energy of 150 KV for an electron beam dose of 5 Mrad. A damping layer of a polyolefin damping adhesive Absortomer EP1001 having a thickness of 15 μm was laminated between these two cross-linked HYTREL 5556 single-layer films to obtain a composite multi-layer diaphragm. The composite multi-layer diaphragm was thermoformed at 145° C. for 10 seconds. The composite multilayer diaphragm has a three-layer composite structure of a HYTREL 5556 elastomer layer (15 μm)/an Absortomer EP1001 damping layer (15 μm)/a HYTREL 5556 elastomer layer (15 μm). According to the measurements described above for measuring tensile modulus, elongation at break, yield strain, and rheological properties, the multilayer diaphragm has a tensile modulus of 120 MPa, a yield strain of 18% and an elongation at break of 210%. It can be known that the multilayer diaphragm having a three-layer composite structure has good strength, elasticity, and thermal stability.

Example 9

The thermoplastic polyester elastomer HYTREL 6356 produced by Dupont Company was hot extruded by an extruder into a single-layer film having a thickness of 15 μm. The single-layer film was divided into two portions. Then, the obtained two HYTREL 6356 single-layer films were radiated by an electron beam having electron beam energy of 150 KV for an electron beam dose of 5 Mrad. A damping layer of a polyolefin damping adhesive Absortomer EP1001 having a thickness of 15 μm was laminated between these two cross-linked HYTREL 6356 single-layer films to obtain a composite multi-layer diaphragm. The composite multi-layer diaphragm was thermoformed at 145° C. for 10 seconds. The composite multilayer diaphragm has a three-layer composite structure of a HYTREL 6356 elastomer layer (15 μm)/an Absortomer EP1001 damping layer (15 μm)/a HYTREL 6356 elastomer layer (15 μm). According to the measurements described above for measuring tensile modulus, elongation at break, yield strain, and rheological properties, the multilayer diaphragm has a tensile modulus of 190 MPa, a yield strain of 15% and an elongation at break of 190%. It can be known that the multilayer diaphragm having a three-layer composite structure has good strength, elasticity, and thermal stability.

Example 10

The thermoplastic polyester elastomer HYTREL 7246 produced by Dupont Company was hot extruded by an extruder into a single-layer film having a thickness of 15 μm. The single-layer film was divided into two portions. Then, the obtained two HYTREL 7246 single-layer films were radiated by an electron beam having electron beam energy of 150 KV for an electron beam dose of 5 Mrad. A damping layer of a polyolefin damping adhesive Absortomer EP1001 having a thickness of 15 μm was laminated between these two cross-linked HYTREL 7246 single-layer films to obtain a composite multi-layer diaphragm. The composite multi-layer diaphragm was thermoformed at 145° C. for 10 seconds. The composite multilayer diaphragm has a three-layer composite structure of a HYTREL 7246 elastomer layer (15 μm)/an Absortomer EP1001 damping layer (15 μm)/a HYTREL 7246 elastomer layer (15 μm). According to the measurements described above for measuring tensile modulus, elongation at break, yield strain, and rheological properties, the multilayer diaphragm has a tensile modulus of 380 MPa, a yield strain of 11% and an elongation at break of 150%. It can be known that the multilayer diaphragm having a three-layer composite structure has good strength, elasticity, and thermal stability.

Although the specific embodiments have been shown and described in the present invention, those skilled in the field will understand that the specific embodiments shown and described may be replaced with various alternative and/or equivalent embodiments without departing from the scope of the invention. This application is intended to cover any adaptations or variations of the specific embodiments discussed in the present invention. Accordingly, the invention is limited only by the claims and the equivalents thereof.

Those skilled in the field will understand that various modifications and changes can be made without departing from the scope of the present invention. Such modifications and changes are intended to fall within the scope of the invention as defined by the appended claims.

What is claimed is:

1. A diaphragm for a microspeaker, the diaphragm being a single-layer diaphragm or a multi-layer diaphragm and comprising at least one layer of a chemically cross-linked thermoplastic polyester elastomer, wherein the chemically cross-linked thermoplastic polyester elastomer has a loss factor less than or equal to 0.4 at all temperatures in a temperature range not higher than a softening temperature of thermoplastic polyester elastomer before chemical cross-linking plus 40° C., as measured by a rheological curve, and wherein the diaphragm further has a yield strain in the range of 7% to 30%.

2. The diaphragm according to claim 1, wherein the chemically cross-linked thermoplastic polyester elastomer has a loss factor less than 0.2 at all temperatures in a temperature range not higher than a softening temperature of thermoplastic polyester elastomer before chemical cross-linking plus 40° C., as measured by a rheological curve.

3. The diaphragm according to claim 1, wherein the chemically cross-linked thermoplastic polyester elastomer has a softening temperature before crosslinking of 200° C. or lower.

4. The diaphragm according to claim 1, wherein the chemically cross-linked thermoplastic polyester elastomer has a softening temperature before crosslinking in a range of 120° C. to 200° C.

5. The diaphragm according to claim 1, wherein the diaphragm has a tensile modulus in a range of 150 MPa to 1000 MPa.

6. The diaphragm according to claim 1, wherein the diaphragm has a thickness in a range of 5 μm to 100 μm.

7. The diaphragm according to claim 1, wherein the chemically cross-linked thermoplastic polyester elastomer is cross-linked by radiation.

8. The diaphragm according to claim 7, wherein the chemically cross-linked thermoplastic polyester elastomer is cross-linked by radiating electron beam.

9. The diaphragm according to claim 1, wherein the multi-layer diaphragm is a diaphragm having three layers.

10. The diaphragm according to claim 9, wherein the multi-layer diaphragm further includes a damping layer.

11. The diaphragm according to claim 10, wherein the damping layer is one or more selected from a group consisting of a silicone damping adhesive layer, an acrylic damping adhesive layer and a polyolefin damping adhesive layer.

12. The diaphragm according to claim 10, wherein the multi-layer diaphragm has a thickness in a range of 10 μm to 100 μm.

13. A method of manufacturing the diaphragm for a microspeaker according to claim 1, the method comprising subjecting a thermoplastic polyester elastomer film to a chemical crosslinking treatment, wherein the chemically cross-linked thermoplastic polyester elastomer has a loss factor less than or equal to 0.4 at all temperatures in a temperature range not higher than a softening temperature before crosslinking of the thermoplastic polyester elastomer plus 40° C., as measured by a rheological curve, and wherein the diaphragm further has a yield strain in the range of 7% to 30%.

14. The method according to claim 13, wherein the chemically cross-linked thermoplastic polyester elastomer has a loss factor less than 0.2 at all temperatures in a temperature range not higher than a softening temperature before crosslinking of the thermoplastic polyester elastomer plus 40° C., as measured by a rheological curve.

15. The method according to claim 13, wherein the thermoplastic polyester elastomer is a thermoplastic polyester elastomer having a softening temperature before crosslinking of 200° C. or lower.

16. The method according to claim 13, wherein the thermoplastic polyester elastomer is a thermoplastic polyester elastomer having a softening temperature before crosslinking in a range of 120° C. to 200° C.

17. The method according to claim 13, wherein the chemical crosslinking treatment comprises crosslinking the thermoplastic polyester elastomer film by radiation.

18. The method according to claim 13, wherein the chemical crosslinking treatment comprises crosslinking the thermoplastic polyester elastomer film by radiating electron beam.

19. The method according to claim 18, wherein the crosslinking by radiating electron beam comprises radiating the thermoplastic polyester elastomer film using an electron beam having electron beam energy of 100 to 300 KV for an electron beam dose of 3 Mrad to 12 Mrad.

20. The method according to claim 13, wherein the chemically cross-linked thermoplastic polyester elastomer film has a thickness in a range of 5 μm to 100 μm.

* * * * *